(12) United States Patent
Cho et al.

(10) Patent No.: US 8,305,710 B2
(45) Date of Patent: Nov. 6, 2012

(54) METAL LAYER HAVING APERTURE, METHOD OF FORMING THE SAME, LIGHT DELIVERY MODULE INCLUDING METAL LAYER HAVING APERTURE, AND HEAT ASSISTED MAGNETIC RECORDING HEAD INCLUDING THE SAME

(75) Inventors: Eun-hyoung Cho, Yongin-si (KR);
Sung-dong Suh, Yongin-si (KR);
Jin-seung Sohn, Yongin-si (KR)

(73) Assignee: Seagate Technology LLC, Cupertino, CA (US)

( * ) Notice: Subject to any disclaimer, the term of this patent is extended or adjusted under 35 U.S.C. 154(b) by 786 days.

(21) Appl. No.: 11/709,709

(22) Filed: Feb. 23, 2007

(65) Prior Publication Data

US 2008/0055343 A1 Mar. 6, 2008

(30) Foreign Application Priority Data

Aug. 31, 2006 (KR) .................. 10-2006-0083655

(51) Int. Cl.
*G11B 5/127* (2006.01)
(52) U.S. Cl. ................................. 360/125.31
(58) Field of Classification Search ............. 360/125.03, 360/125.04, 125.09, 125.17, 125.12, 125.16, 360/125.06, 125.15, 125.26, 125.71, 125.02, 360/126.13, 125.31, 125.21, 125.24, 125.27
See application file for complete search history.

(56) References Cited

U.S. PATENT DOCUMENTS

| | | | |
|---|---|---|---|
| 5,831,792 A * | 11/1998 | Ananth | 360/236.6 |
| 6,721,138 B1 * | 4/2004 | Chen et al. | 360/317 |
| 6,834,027 B1 | 12/2004 | Sakaguchi et al. | |
| 6,982,932 B2 * | 1/2006 | Sakakima et al. | 369/13.17 |
| 7,489,616 B2 * | 2/2009 | Takahashi et al. | 369/112.01 |
| 8,059,374 B2 * | 11/2011 | Zhao et al. | 360/324.2 |
| 8,119,265 B2 * | 2/2012 | Hsia et al. | 428/832 |
| 2003/0137772 A1 * | 7/2003 | Challener | 360/131 |
| 2004/0062152 A1 | 4/2004 | Stancil et al. | |
| 2006/0153058 A1 * | 7/2006 | Takahashi et al. | 369/300 |
| 2006/0187564 A1 | 8/2006 | Sato et al. | |
| 2006/0222904 A1 * | 10/2006 | Hsia et al. | 428/832 |
| 2007/0230047 A1 * | 10/2007 | Jin et al. | 360/126 |
| 2007/0242396 A1 * | 10/2007 | Shimazawa et al. | 360/324.12 |
| 2008/0278864 A1 * | 11/2008 | Zhang et al. | 360/324.12 |
| 2010/0177449 A1 * | 7/2010 | Zhao et al. | 360/324.12 |
| 2012/0009337 A1 * | 1/2012 | Zhang et al. | 427/131 |
| 2012/0045662 A1 * | 2/2012 | Zou et al. | 428/810 |
| 2012/0113541 A1 * | 5/2012 | Hsia et al. | 360/59 |

FOREIGN PATENT DOCUMENTS

JP 2002-50001 A 2/2002

* cited by examiner

*Primary Examiner* — Allen Cao
(74) *Attorney, Agent, or Firm* — Hollingsworth Davis, LLC (57) ABSTRACT

A metal layer having an aperture for delivering light, a method of forming the same, a light delivery module including the metal layer having the aperture, and a heat assisted magnetic recording head including the same are provided. The aperture of the metal layer has an inlet and an outlet of different sizes, and also has curved side surfaces. Also, the light delivery module includes the metal layer at an output end thereof, and the heat assisted magnetic recording head includes the light delivery module as an optical heating unit.

19 Claims, 9 Drawing Sheets

METAL LAYER HAVING APERTURE, METHOD OF FORMING THE SAME, LIGHT DELIVERY MODULE INCLUDING METAL LAYER HAVING APERTURE, AND HEAT ASSISTED MAGNETIC RECORDING HEAD INCLUDING THE SAME

CROSS-REFERENCE TO RELATED PATENT APPLICATIONS

This application claims priority from Korean Patent Application No. 10-2006-0083655, filed on Aug. 31, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a magnetic recording head, and more particularly, to a metal layer having a C-shaped nano-aperture, a method of forming the same, a light delivery module including the metal layer, and a heat assisted magnetic recording head including the same.

2. Description of the Related Art

As technologies for magnetic recording heads and magnetic recording methods become more highly developed, the recording density of magnetic recording media increases. However, an increase in recording density causes a decrease in an area of the magnetic recording medium in which minimum unit information is recorded, namely, a bit size, which causes the bit size to be affected by a super-paramagnetic effect. Consequently, thermal instability of the bit size in the magnetic recording medium is worsened, which makes it difficult to implement a higher recording density.

To achieve high thermal stability of data, a material having a strong coercive force is commonly used as the magnetic recording medium. When a material having a strong coercive force is used, a stronger magnetic field is needed to record data. However, since at a certain point the intensity of the magnetic field generated from the magnetic recording head becomes saturated, a material having a strong coercive force may cause difficulties in recording.

The aforementioned problem may be solved to some degree by using a heat assisted magnetic recording (hereinafter, referred to as HAMR) method in which an area where data is to be recorded is heated before recording data to the heated region.

In the HAMR method, a light delivery module is used as a unit for heating a data recording region. The light delivery module includes a light waveguide transmitting light generated by a light source such as a laser diode. A nano aperture is provided at a light exit surface, which generates an enhanced near field by changing the energy distribution of the transmitted light.

Since the data recording region is heated to near the Curie temperature in the HAMR method, the light delivery module provided in the magnetic recording head used in the HAMR method should be able to emit light having an intensity high enough to perform heating while having a small spot size so as to increase a recording density.

Recently, various types of a light delivery module for the HAMR method have been proposed, and most of them include a square aperture, a circular aperture or a C-shaped aperture.

As for a light delivery module including the square aperture or the circular aperture, when an aperture size is smaller than 1% of a wavelength of incident light, the optical power throughput decreases in proportion to $(\text{wavelength})^{-4}$.

As for a light delivery module including the C-shaped aperture, a main pole of a magnetic head may be used as a ridge of the aperture. In this case, the distance between a magnetic field and light may be minimized, but a magnetic characteristic of the main pole may be lowered due to heat.

However, the shape and the size of a nano aperture have not been optimized for maximum near field enhancement. In particular, since the coupling efficiency between an exit surface of the waveguide and an inlet of a nano aperture, and a light spot profile at an outlet of the nano aperture are individually taken into account, the shape and the size of the nano aperture cannot be optimized. Therefore, a break from the structural simplicity of the related art nano aperture should be attempted in order to reduce the size of a light spot and maximize a near field enhancement effect.

SUMMARY OF THE INVENTION

The present invention provides a metal layer comprising an aperture, which can reduce a power throughput loss of light outputted from a waveguide, and reduce a spot size.

The present invention also provides a method of forming a metal layer having the aperture.

The present invention also provides a light delivery module comprising the metal layer.

The present invention also provides a heat assisted magnetic recording (HAMR) head comprising the light delivery module to increase a recording density.

According to an aspect of the present invention, there is provided a metal layer for delivering light, the metal layer comprising an aperture comprising an inlet and an outlet of different sizes, and side surfaces that are curved.

The aperture may have a C-shape due to a ridge of the metal layer.

The ridge may have a sectional size changing between a start point and an end point of the ridge.

The aperture may have a sectional shape at a random position between the inlet and the outlet of the aperture, which allows resonance with light incident on the aperture.

A width of the aperture along a long axis at the random position between the inlet and the outlet of the aperture may be determined by a first equation.

A width of the ridge at the random position between the inlet and the outlet of the aperture may be determined by a second equation.

According to another aspect of the present invention, there is provided a method of forming a metal layer, the method comprising: forming on a substrate a first metal layer having a ridge that has a width that varies depending on a location; forming a photoresist pattern on the first metal layer, the photoresist pattern covering the ridge; and forming a second metal layer on the first metal layer which covers the photoresist pattern, wherein the photoresist pattern has a width that varies depending on a location, and has curved side surfaces.

The forming of the first metal layer comprising the ridge may include: forming a metal layer having a uniform thickness on the substrate; forming a mask which defines the ridge on the metal layer; removing a part of the metal layer around the mask to a predetermined thickness; and removing the mask.

The photoresist pattern may have a width varying between a start point of the ridge and an end point of the ridge, which satisfies the first equation, and a thickness of the photoresist pattern on the ridge may have a constant value M.

Here, M may be determined according to light incident onto the photoresist pattern, and denotes a shortest distance between an end portion of the ridge and the second metal layer facing the end portion. M may be determined by a third equation.

The mask defining the ridge may have a width determined by the second equation.

The method of forming the metal layer may further include polishing end portions of the second metal layer, the photoresist pattern, the first metal layer, and the substrate to expose an end surface corresponding to an end point of the ridge having a narrow width, after the forming of the second metal layer.

The method of forming the metal layer may further include removing the photoresist pattern after the forming of the second metal layer.

According to another aspect of the present invention, there is provided a light delivery module comprising: a light waveguide; and a metal layer attached to an output end of the light waveguide and comprising the aperture of the metal layer.

The aperture may be a tapered type.

A width or a height of the inlet of the aperture may be greater than a width or a height of the outlet of the aperture, respectively, or the width and the height of the inlet of the aperture are greater than the width and the height of the outlet of the aperture, respectively.

The aperture may comprise an inlet having a shape allowing resonance with light incident on the aperture.

The aperture may comprise an outlet having a shape allowing resonance with the incident light.

The aperture may comprise an inlet and an outlet having the same area.

The aperture may have a sectional shape taken between an inlet and an outlet of the aperture, which allows resonance with the incident light.

The aperture may have a section that is be divided into a first portion having a rectangular shape, and two second portions extending from both sides along a long axis of the first portion in a direction that is perpendicular to the first portion, and spaced apart from each other.

According to another aspect of the present invention, there is provided a heat assisted magnetic recording head comprising: a magnetic recording unit including a main pole and a return pole that record data to a magnetic recording medium; and an optical heating unit which heats a data recording region of the magnetic recording medium, the optical heating unit comprising a metal layer having an aperture comprising an inlet and an outlet of different sizes, and curved side surfaces.

The optical heating unit, which is a light delivery module, may comprise: a light waveguide which transmits light emitted from a light source; and the metal layer attached to an output end of the light waveguide.

A prism coupler or a grating coupler between the light source and the light waveguide may be further included.

All of characteristics of the aperture may be the same as those described in the light delivery module.

The aperture may be formed at a light output end of the optical heating unit.

In the metal layer, the light delivery module, and the HAMR head, a groove may be further formed at the metal layer around an inlet of the aperture. The groove may be a ring type groove. The ring type groove has an outer radius that is 0.5 to 1.5 times greater than a wavelength of light incident on the aperture.

According to still another aspect of the present invention, structural characteristics of the aperture may allow an increase in both light intensity and power throughput at the exit surface of the aperture. The increase in the light intensity and power throughput of light can be further achieved by forming the groove around the aperture.

Therefore, the HAMR head provided with the light delivery module employing the aperture according to an aspect of the present invention is able to emit symmetrical light which has a high intensity and a small spot size, thereby increasing a data recording density.

In addition, since the HAMR head according to an aspect of the present invention does not use the main pole as a ridge of the aperture, magnetic properties of the main pole are not lowered due to heat.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

A metal layer having an aperture, a method of forming the same, a light delivery module including the metal layer having the aperture, and a heat assisted magnetic recording head according to an exemplary embodiment of the present invention will now be described in detail with reference to the accompanying drawings. The thicknesses of layers and regions are exaggerated for clarity.

First, a metal layer having a C-shaped nano aperture (hereinafter, referred to as an aperture) according to an exemplary embodiment of the present invention will now be described.

Figure 1:
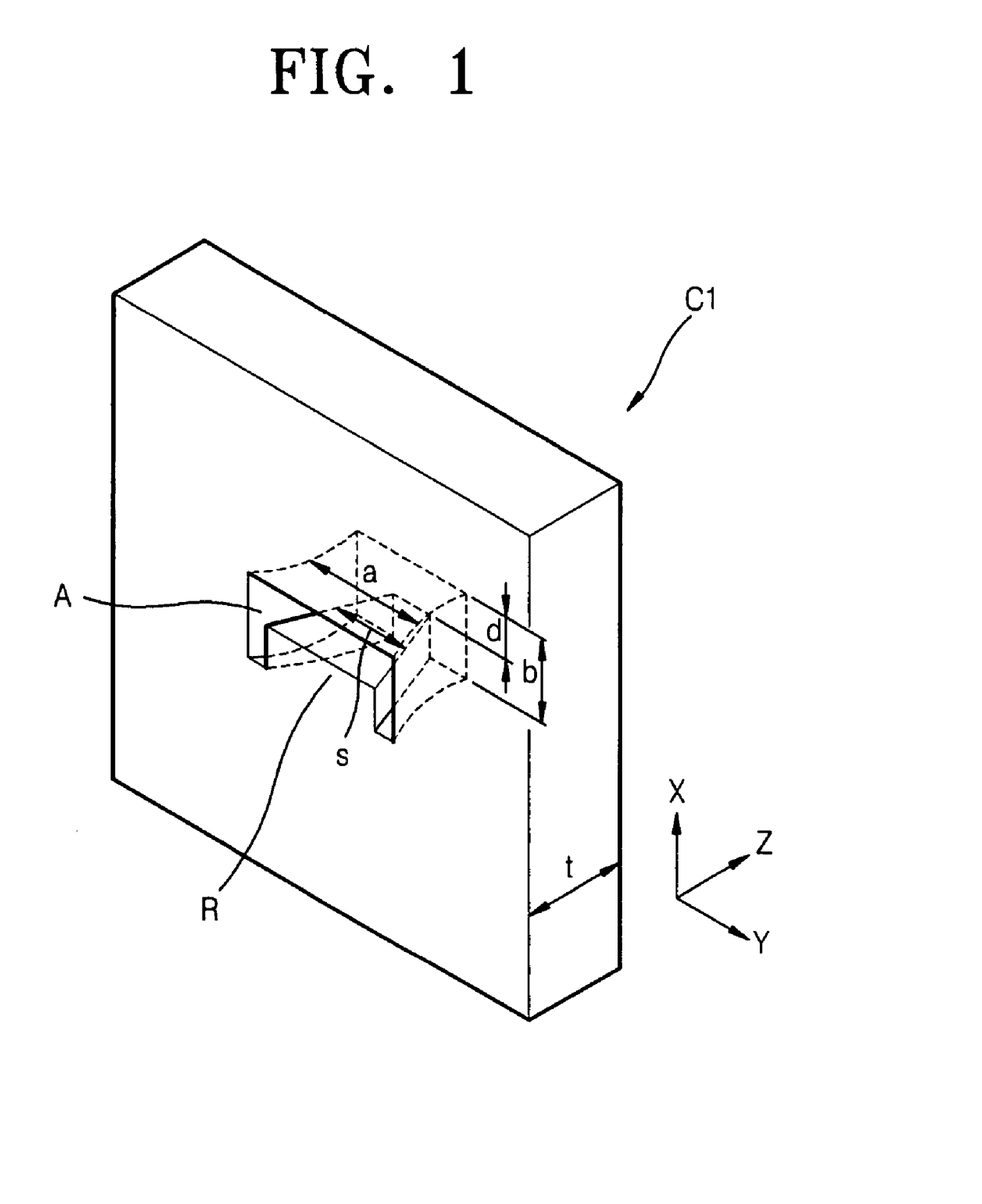
FIG. 1 is a perspective view of a metal layer having an aperture according to an exemplary embodiment of the present invention.
Figure 2:
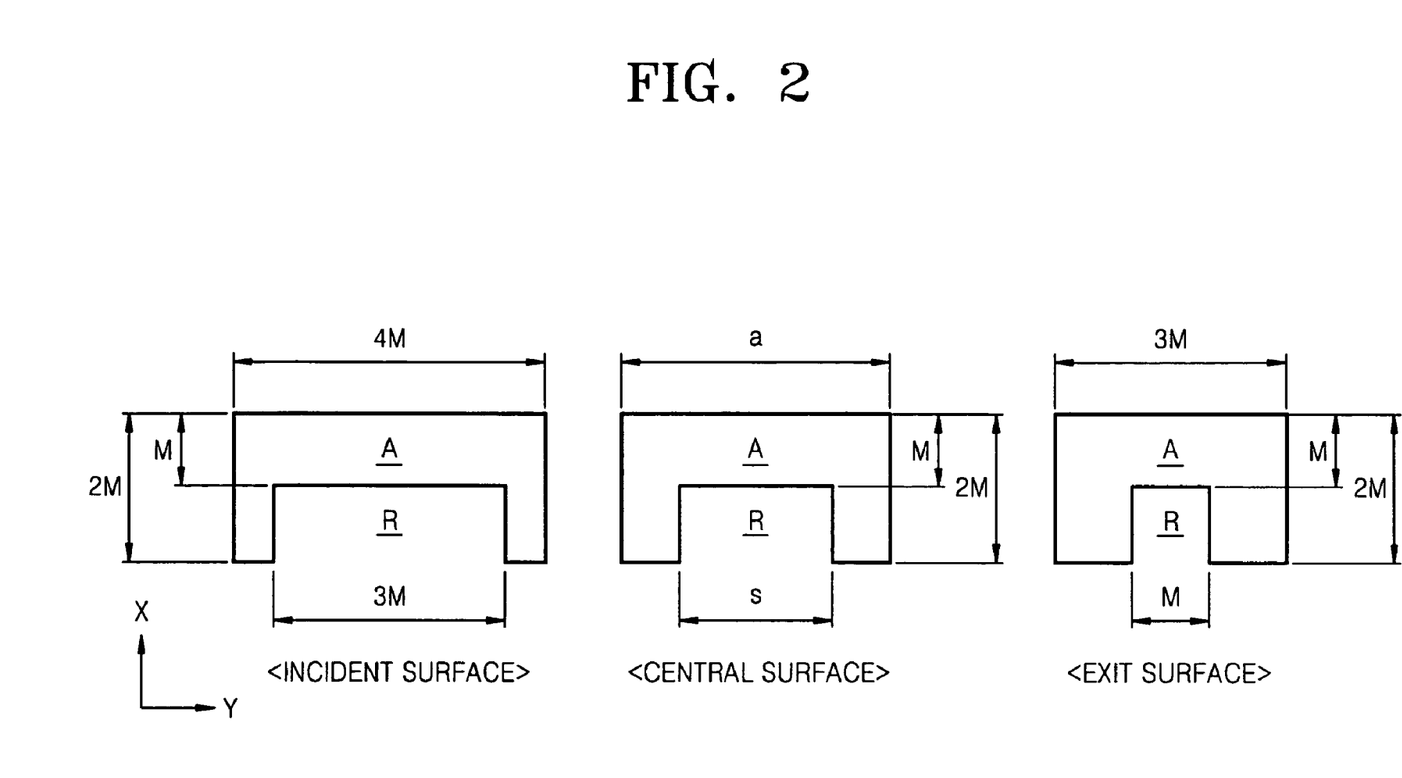
FIG. 2 is a view illustrating an incident surface and an exit surface of the metal layer depicted in FIG. 1, and a central section of the metal layer taken between the incident and exit surfaces in a direction perpendicular to a Z axis, according to an exemplary embodiment of the present invention.
Figure 3:
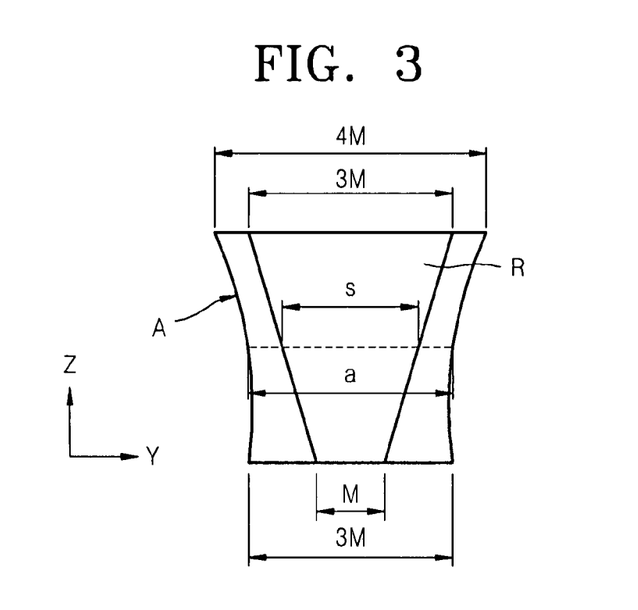
FIG. 3 is a plan view of a ridge and an aperture of the metal layer depicted in FIG. 1 taken parallel to the Z-axis and perpendicular to an X-axis, according to an exemplary embodiment of the present invention.

Embodiment of FIGS. 1-3

FIG. 1 is a perspective view of a metal layer C1 having an aperture A according to an exemplary embodiment of the present invention.

Referring to FIG. 1, the sizes of an inlet and an outlet of the aperture A are different from each other, and the side surfaces of the aperture A are curved. The aperture A is formed by forming a ridge R in a quadrangular contact hole. The metal layer C1 may be used in a state where it is rotated counterclockwise about the Z-axis to an angle of 90°. The aperture A may have a C-shape due to the ridge R of the metal layer C1. The aperture A may have a shape other than the C-shape according to a rotation angle of the metal layer C1, but the C-shaped aperture A is described in the current exemplary embodiment.

A width (a) of the aperture A in the Y-direction is wider at an inlet and narrower at an outlet (i.e., is tapered from the inlet toward the outlet). The width (a) of the aperture in a Y-direction may be 4M at the inlet, and 3M at the outlet. A width of the aperture A in an X-direction is M at a region where the ridge R is present, and 2M at a region where the ridge is not formed. The width of the aperture A in the X-direction is the same from the inlet and to the outlet of the aperture A. The value M used to represent the width of the aperture A is a constant determined according to a wavelength of light incident on the aperture A. For example, when a wavelength of incident light is 780 nm, M is about 90 nm. A description of M will be further provided later. The width of the ridge R in the Y-direction is tapered from the inlet toward the outlet of the aperture A. In contrast, a width of the ridge R in the X-direction (i.e., a height in a case where the aperture A is in a state illustrated in FIG. 1 without being rotated) is the same from the inlet and to the outlet of the aperture A.

Consequently, both the aperture A and the ridge R are entirely formed in a tapered shape from the inlet toward the outlet.

If the ridge R is formed in a Z-direction in the metal layer C1 having the aperture A as illustrated, the width (s) of the ridge R in the Z-direction is determined by Equation 1 below.

$$s = -\frac{2M}{t}z + 3M, \quad \text{[Equation 1]}$$

where M denotes a width (d) in the X-direction of the aperture A in a region where the ridge R is present, which satisfies resonance conditions for making a resonance frequency of the aperture A the same as a frequency of light incident on the aperture A. That is, M denotes the shortest distance between an end portion (an upper surface in the current drawing) of the ridge R in a direction in which the ridge is grown (i.e., the X-direction) and the metal layer C1 facing the end portion. M may vary depending on the characteristics of the light incident on the aperture A.

M of Equation 1 is determined by Equation 2.

$$\frac{b}{\lambda_c} = \quad \text{[Equation 2]}$$

$$\frac{b}{2(a-s)}\left[1 + \frac{4}{\pi}\left(1 + 0.2\sqrt{\frac{2b}{a-s}}\right)\frac{2b}{a-s}\ln\csc\frac{\pi}{2}\frac{d}{b} + \left(2.45 + 0.2\frac{s}{a}\right)\frac{sb}{d(a-s)}\right]^{-1/2},$$

where a, b, d and s are 3M, 2M, M and M, respectively, and $\lambda_c$ denotes a cutoff wavelength of incident light. Here, b denotes a width of the aperture A in the X-direction at a portion where the ridge R is not formed, and d denotes a width of the aperture A in the X-direction in a region where the ridge R is present.

In Equation 2, since the cutoff wavelength is a wavelength of light incident on the aperture A, it can be seen that M may vary depending on the wavelength of the incident light. For example, when the wavelength of the incident light is 780 nm as described above, M is about 90 nm.

Also, in Equation 1, t denotes a thickness of the metal layer C1 having the aperture A in the Z-direction. The thickness t is optimized to maximize light emission. That is, t is determined by measuring changes in an electric field strength and an optical power throughput while increasing the thickness of the metal layer in the Z-direction. When a material of the metal layer C1 is gold (Au), and a wavelength of incident light is 780 nm, the optimum thickness (t) of the aperture A is about 280 nm.

The width (a) of the aperture A in the Y-direction at a position (z) between the inlet (z=0) and the outlet (z=t) of the aperture A is determined by Equation 3 below. The width (a) of the aperture A in the Y-direction may also be referred to as a width (a) of the aperture A along a long axis thereof.

$$a=(a_0+a_1z+a_2z^2)M, \quad \text{[Equation 3]}$$

where $a_0$ is 3.96231, $a_1$ is −0.00137, and $a_2$ is −0.0002.

Since b (=2M) and d (=M) of the aperture A are fixed by Equation 2, once incident light is determined, when the width (s) of the ridge R and the width (a) of the aperture A at a predetermined depth of the aperture A, that is, a predetermined z value, are determined by Equations 1 and 3, a sectional shape of the aperture A at a location corresponding to the predetermined z value is determined. In this manner, the resonance frequency of the aperture A is made the same as a frequency (a cutoff frequency) of light incident on the section of the aperture A.

The width (s) of the ridge R and the width (a) of the aperture A in FIG. 1 satisfy Equations 1 and 3, respectively. Accordingly, a sectional shape of the aperture A taken from a position between the inlet and the outlet in a direction perpendicular to the Z-axis satisfies resonance conditions for making the resonance frequency of the aperture A the same as a frequency of light incident on the aperture A.

When the sectional shape of the aperture A taken in the direction perpendicular to the Z-axis satisfies the resonance conditions as mentioned above, it is defined that the aperture A has a resonant area.

An inlet area and an outlet area of the aperture A illustrated in FIG. 1 have the same area while satisfying the resonance conditions. However, when the functions of Equations 1 and 3 are taken into account, it can be seen that a sectional area of the aperture A taken at a location between the inlet and the outlet in the direction perpendicular to the Z-axis is different from the inlet area and the outlet area of the aperture A.

FIG. 2 illustrates an incident surface (inlet), a central surface and an exit surface (outlet) of the aperture A depicted in FIG. 1, according to an exemplary embodiment of the present invention.

In FIG. 2, the very left view is a front view of the aperture A, the very right view is a rear view of the aperture A, and a middle view is a sectional view of the aperture A taken in the middle between the inlet and the outlet of the aperture.

Referring to FIG. 2, a width of the ridge R is 3M at the inlet of the aperture A, a width of the ridge R is M at the outlet of the aperture A, and a width of the ridge R is a value (s) determined by Equation 1 in the middle between the inlet and the outlet of the aperture A. A height of the aperture A in a region where the ridge R is present is M, and a height of the aperture A at a part of the aperture where no ridge R is present is 2M. Also, a width of the inlet of the aperture A in the Y-direction is 4M, a width of the outlet of the aperture in the Y-direction is 3M, and a width of the middle part between the inlet and the outlet in the Y-direction is a value (a) determined by Equation 3.

FIG. 3 is a sectional view of the metal layer C1 including the aperture A taken in a direction parallel to the Y and Z-directions, according to an exemplary embodiment of the present invention. An upper surface of the ridge R and a plane shape of the aperture A are revealed more clearly in FIG. 3.

Referring to FIG. 3, lines that respectively connect both ends of the upper surface of the ridge R disposed at the inlet of the aperture A to both ends of the upper surface of the ridge R disposed at the outlet of the aperture A are straight lines. In other words, a boundary line between each side surface and the upper surface of the ridge R is a straight line. This result is a corollary from Equation 1.

Specifically, in Equation 1, s is a linear function with respect to a random value somewhere between the inlet and the outlet of the aperture C1, namely, with respect to a random value on the Z-axis. Consequently, a line defined by s of Equation 1 is a straight line. Since the width of the ridge R does not vary in an upward direction, namely, the X-direction, the width(s) of the ridge R is the same as the width of the upper surface of the ridge R. Accordingly, as illustrated in FIG. 3, the sides of the ridge R that run from the inlet of the aperture A to the outlet of the aperture A are straight lines that are defined by s of Equation 1.

In FIG. 3, left and right boundary lines (hereinafter, referred to as boundaries) of the aperture A, namely, lines showing a change in the width (a) of the aperture A, are curved lines, and this result is a corollary from Equation 3.

Since a is a quadratic function with respect to the z value, and the width (a) of the aperture A does not change in the X-direction, lines expressed by Equation 3, that is, the boundaries representing the change in the width (a) of the aperture A are curved lines.

In this manner, since Equations 1 and 3 that determine the width (s) of the ridge R and the width (a) of the aperture A have different proportional relations with the z value, the sectional area of the aperture A exposed when the metal layer is cut at a random position between the inlet and the outlet of the aperture A in a direction perpendicular to the Z-axis is different from the inlet area of the aperture A and also from the outlet area thereof.

Figure 4:
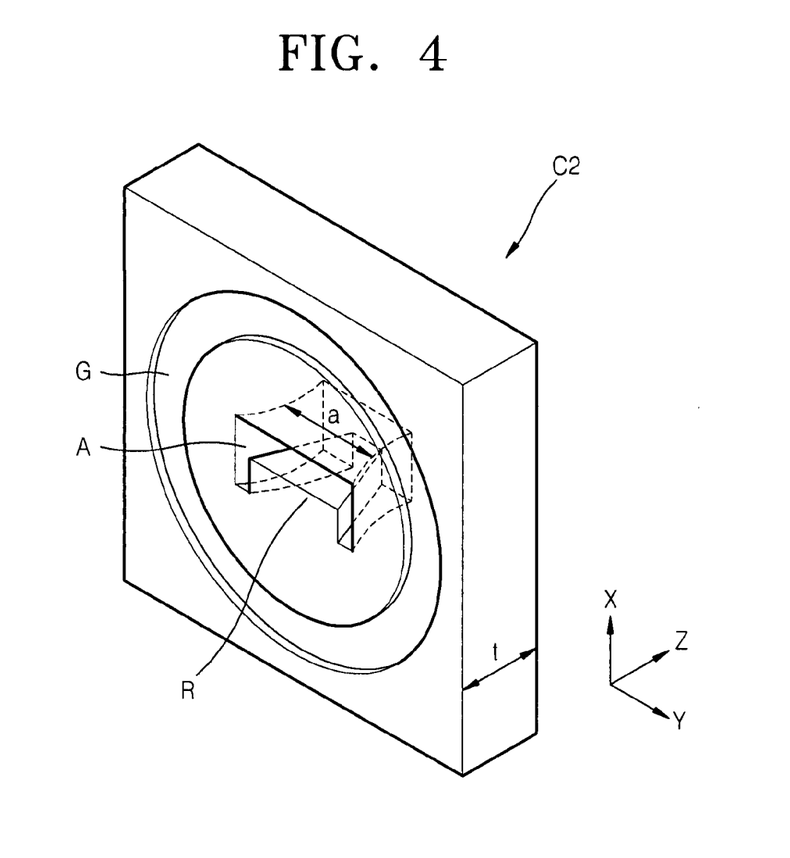
FIG. 4 is a perspective view of a metal layer having an aperture according to another exemplary embodiment of the present invention.

Embodiment of FIG. 4

An aperture A according to another exemplary embodiment of the present invention is characterized in that a groove is formed at a circumference of the aperture A in the metal layer C1 of the exemplary embodiment depicted in FIGS. 1-3. Hereinafter, the metal layer C1 according to the exemplary embodiment of the present invention depicted in FIG. 1 is referred to as a first metal layer C1.

FIG. 4 shows one example of a metal layer (hereinafter, referred to as a second metal layer) having an aperture according to another exemplary embodiment of the present invention.

Referring to FIG. 4, the second metal layer C2 includes the aperture A of the first metal layer C1, and a ring type groove G. The ring type groove G is formed around the aperture A. An outer radius of the ring type groove G may be 0.5 to 1.5 times greater than a wavelength of light incident onto the second metal layer C2. For example, when a wavelength of the incident light is 780 nm, the outer radius of the ring type groove G may be 780 nm. Here, an inner radius and a depth of the ring type groove G may be 540 nm and 50 nm, respectively. The outer radius, the inner radius and the depth of the ring type groove G may vary according to a type of light incident onto the second metal layer C2 and the size of the second metal layer C2.

Since the ring type groove G of the second metal layer C2 generates a surface plasmon effect, a field enhancement effect of the aperture A can be further improved.

To confirm this fact, the inventors of the present application performed a finite difference time domain (FDTD) simulation on the second metal layer C2. In the simulation, a material of the second metal layer C2 was gold (Au), a thickness thereof in the Z-direction was 280 nm, and a wavelength of light incident on the aperture A and the ring-type groove G of the second metal layer C2 was 780 nm.

As a result of the simulation, the intensity of light (an intensity of an electric field) passing through the aperture A of the second metal layer C2 was $22.5149(V^2/m^2)$, the optical power throughput PT was 3.7697, and the full widths at half maximum of a spot in the X-direction and the Y-direction were 140 nm and 145 nm, respectively.

The result of the simulation reveals that the intensity and the PT of the electric field of the light passing through the aperture A of the second metal layer C2 is increased by about three times compared to those of a related art C-shaped aperture.

Preferably, but not necessarily, a light incident surface of the aperture A of the present invention has a width wider than that of a light exit surface, and has the same height as that of the exit surface. However, the present invention is not limited thereto. For example, the height of the incident surface of the aperture A of the present invention may be higher than that of the exit surface. Also, both the width and the height of the incident surface may be greater than those of the exit surface.

A method of forming a metal layer having an aperture according to an exemplary embodiment of the present invention will now be described with reference to FIGS. 5A through 5E.

Figure 5A:
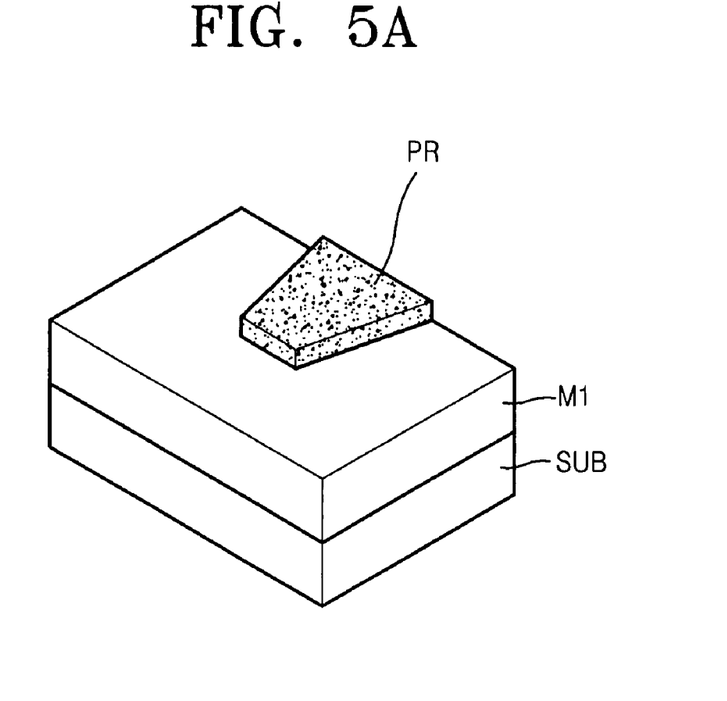
FIGS. 5A through 5E are perspective views sequentially showing a method of forming a metal layer having an aperture according to an exemplary embodiment of the present invention.

Referring to FIG. 5A, a first metal layer M1 having a uniform thickness is formed on a substrate SUB. The first metal layer M1 may be a gold (Au) layer. A mask PR is formed on the first metal layer M1. The mask PR may be photoresist layer. The geometrical shape and the dimensions of the mask PR may be the same as those of the ridge R illustrated in FIG. 4.

Figure 5B:
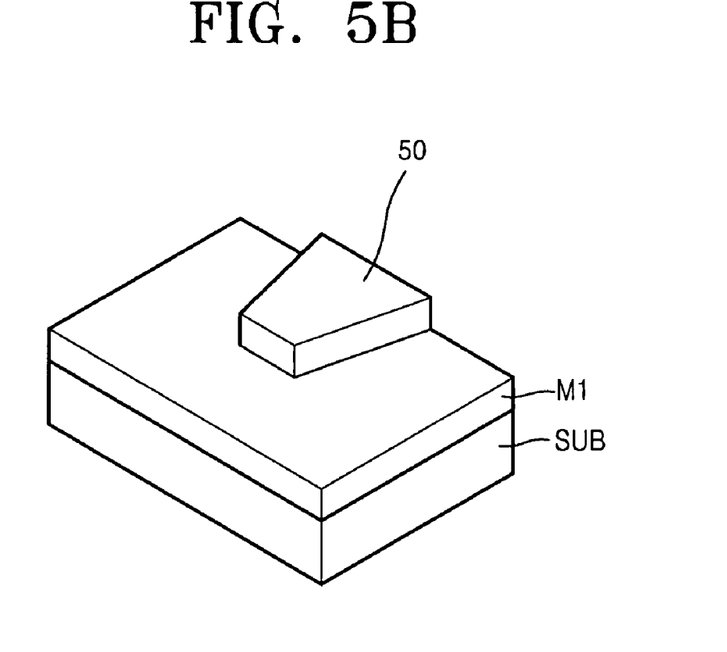

Referring to FIG. 5B, the first metal layer M1 around the mask PR is etched until it has a predetermined thickness, and then the mask PR is removed. Thus, a ridge 50 is formed at the first metal layer M1. Since the shape of the mask PR is transferred to the ridge 50 as it is, the geometrical shape and dimensions of the ridge 50 are the same as those of the ridge R of FIG. 1.

Figure 5C:
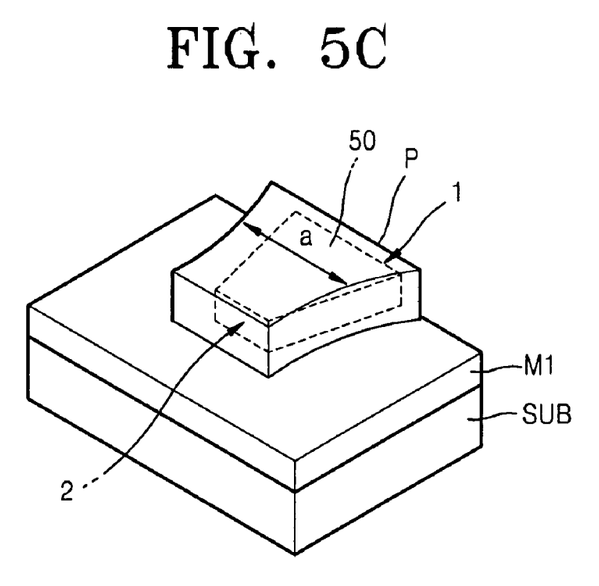

Thereafter, referring to FIG. 5C, a photoresist pattern P covering the ridge 50 is formed on the first metal layer M1.

Specifically, a photoresist layer (not shown) covering the ridge 50 is formed on the first metal layer M1 around the ridge 50. Then, a mask (not shown) for defining the photoresist pattern P is formed on the photoresist layer. Therefore, the shape and dimensions of the mask are preferably, but not necessarily, the same as those of the photoresist pattern P. After the mask is formed, exposure and development processes are performed thereon to remove the photoresist layer around the mask. Then, the mask is removed. In this manner, the photoresist pattern P is formed. Since the photoresist pattern P ultimately defines an aperture illustrated in FIG. 1, a width (a) of the photoresist pattern P is determined by Equation 3. Furthermore, since the photoresist pattern P is a result of a transfer of the mask shape during the exposure process, the mask has a width satisfying Equation 3.

Although not shown in the drawing, part of the photoresist pattern extending from an end surface (start point 1) of the ridge 50 having a wider width may serve as part of a waveguide.

When the photoresist layer around the mask is removed by the exposure and development processes, an end surface (end point 2) of the ridge 50 having a narrower width may be exposed. That is, the photoresist pattern may cover only both side surfaces, an upper surface, and the end surface 1 of the ridge 50 having the wider width. Even in this case, the part of the photoresist pattern extending from the wider end surface 1 may still serve as part of the waveguide.

Figure 5D:
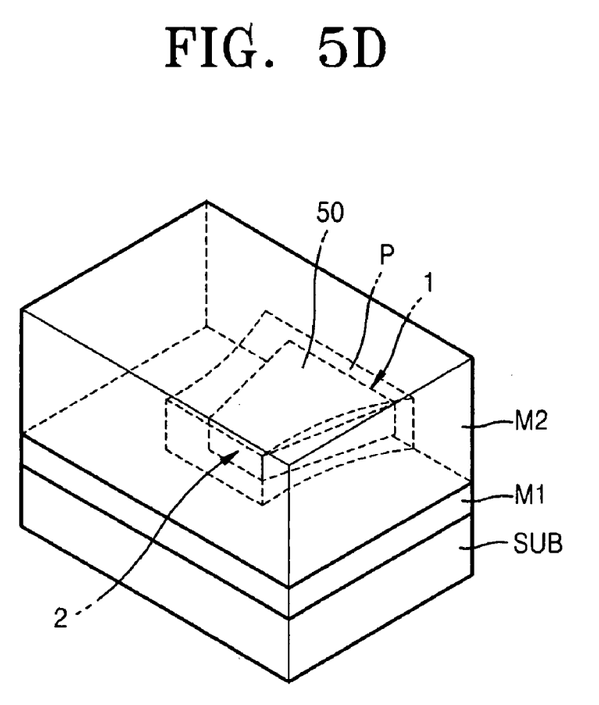

Referring to FIG. 5D, a second metal layer M2 is formed on the first metal layer M1 to cover the photoresist pattern P. The second metal layer M2 may be an Au layer.

Figure 5E:
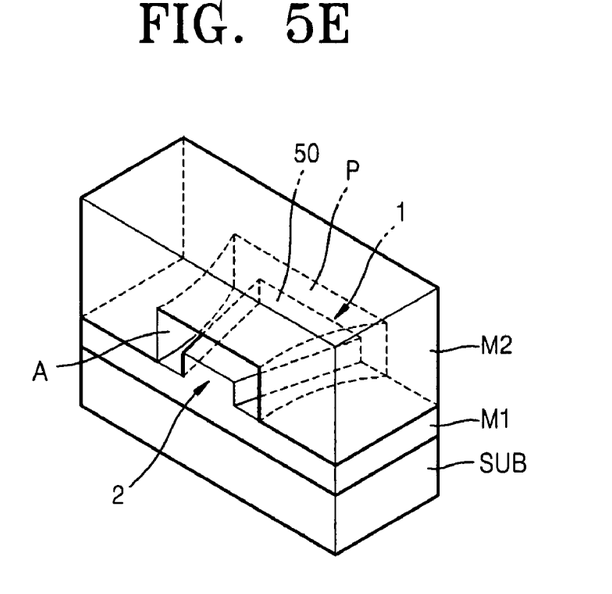

Referring to FIG. 5E, after the second metal layer M2 is formed, end portions the second metal layer M2, the photoresist pattern P, the first metal layer M1, and the substrate SUB are polished to expose the narrower end surface (end point 2) of the ridge 50. A chemical mechanical polishing (CMP) process may be used as the polishing method. In this manner, a metal layer having an aperture A having curved side surfaces that connect an inlet and an outlet thereof is formed. The aperture A may be the photoresist pattern P. Otherwise, the photoresist pattern P may be removed to leave the aperture A empty.

When the aperture A according to the exemplary embodiment of the present invention is formed, a part of the waveguide connected to the inlet of the aperture A may be formed together as mentioned above. The part of the waveguide is a portion formed of a layer having a stacked structure including a metal layer and a photoresist layer.

A light delivery module according to an exemplary embodiment of the present invention (hereinafter, referred to as a light deliver module of the present invention) will now be described.

Figure 6:
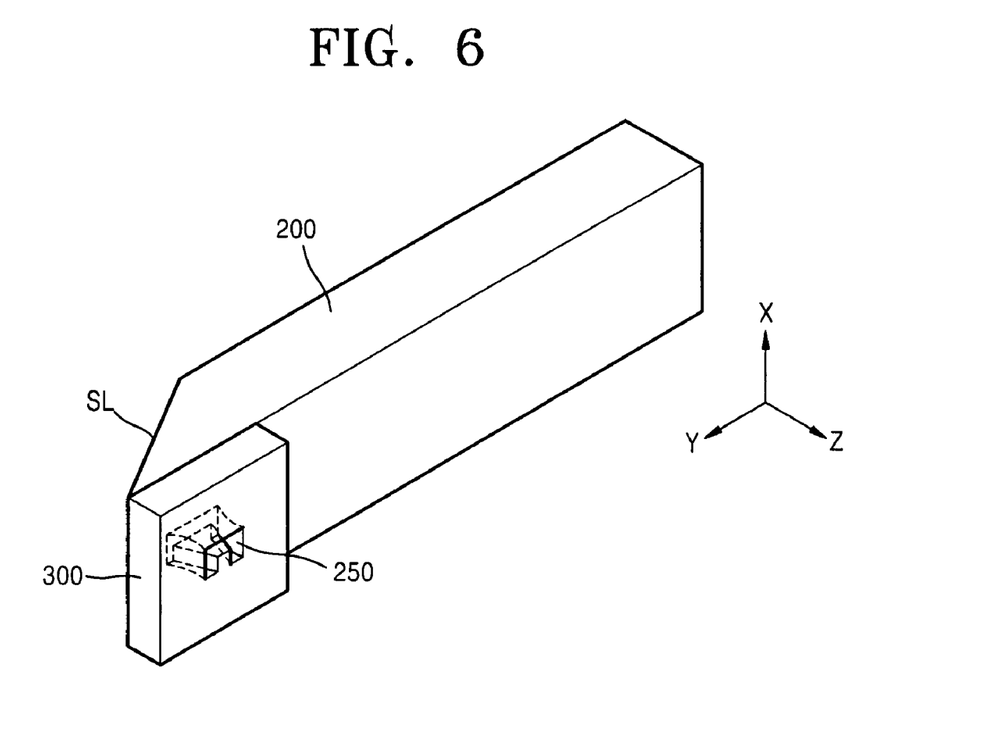
FIG. 6 is a perspective view of a light delivery module having the metal layer of FIG. 1, according to an exemplary embodiment of the present invention.
Figure 7:
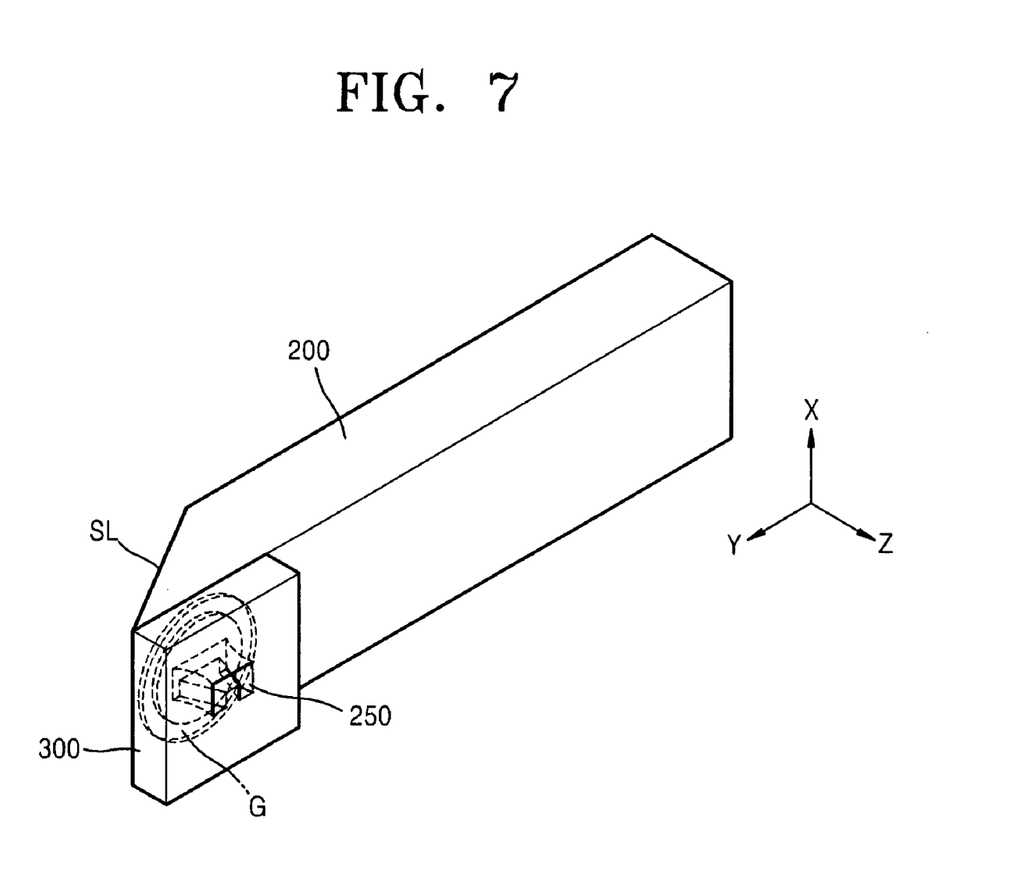
FIG. 7 is a perspective view of a light delivery module having the metal layer of FIG. 4, according to an exemplary embodiment of the present invention.

Referring to FIG. 6, the light delivery module of the present invention includes a light waveguide 200, and a metal layer 300 having an aperture 250. The metal layer 300 is attached to a light output end of the light waveguide 200. A light source, for example, a laser diode, may be attached to a light input end of the light waveguide 200. A back of the light output end of the light waveguide 200 has a slanted surface SL. Thus, light incident on the light input end of the light waveguide 200 passes through the light waveguide 200, is reflected by the slanted surface SL, and is outputted through the light output end and the aperture 250 of the metal layer 300. The aperture 250 may be filled with a transparent insulating layer, for example, a photoresist layer. Various coupling methods and coupling positions may be used for the light waveguide 200 and the metal layer 300. Also, as illustrated in FIG. 7, the metal layer 300 having the aperture 250 may have a groove G around the aperture 250, according to an exemplary embodiment of the present invention.

An heat assisted magnetic recording (HAMR) head according to an exemplary embodiment of the present invention will now be described.

Figure 8:
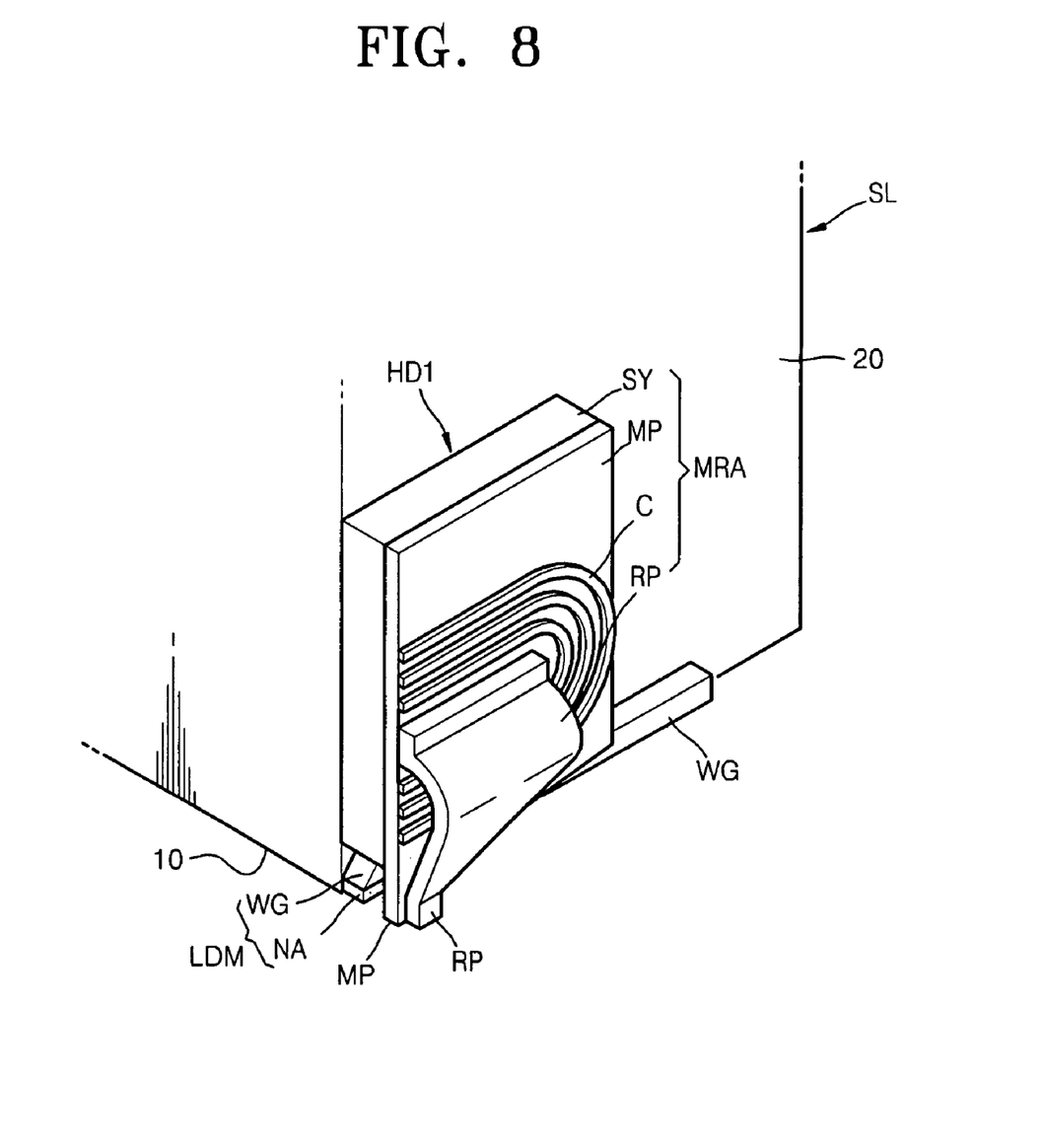
FIG. 8 is a perspective view of an HAMR head only for recording according to an exemplary embodiment of the present invention.

Referring to FIG. 8, the HAMR head HD1 according to an exemplary embodiment of the present invention is provided with a magnetic recording unit MRA including a main pole MP applying a magnetic field to a magnetic recording medium, and a return pole RP magnetically connected to the main pole MP and forming a magnetic path. Parts of the main pole MP and the return pole RP close to the recording medium (not shown) are maintained a short distance away from each other, and have a width that is the same as or narrower than a track width. The HAMR head HD1 further includes a light delivery module LDM that emits light to a data recording region of the recording medium and thus functions as a heating unit for heating the data recording region. The light delivery module LDM is placed directly in front of the main pole MP so that the data recording region (to which data is to be recorded) can be heated before data recording. The light delivery module LDM may be the same as the light delivery module illustrated in FIGS. 6 and 7.

Light emitted through a light waveguide WG of the light delivery module LDM passes through a metal layer NA having an aperture, and is emitted to the data recording region of the recording medium. The metal layer NA is any one of the metal layers illustrated in FIGS. 1 and 4. Here, the metal layer NA is attached to an output end of the light waveguide WG such that a portion the aperture having a narrower width faces the recording medium. Both the intensity and the power throughput of light emitted through the aperture of the metal layer NA are increased as compared to the related art.

The HAMR head HD1 is mounted on a first surface 20 of a slider SL. The first surface 20 is perpendicular to a bottom surface 10 of the slider SL facing the recording medium. The HAMR head HD1 is mounted such that all of the main pole MP, the return pole RP and the metal layer NA face the recording medium.

The magnetic recording unit MRA includes a coil C generating a recording magnetic field, the main pole MP and the return pole RP recording data onto the recording medium using the magnetic field formed by the coil C, and a sub-yoke SY attached to the main pole MP above the light delivery module LDM.

A light source (not shown) supplying light to the light waveguide WG and the light waveguide WG may be butt-coupled through direct bonding. Also, the light source and the light waveguide WG may be coupled by a prism coupler or a grating coupler.

Figure 9:
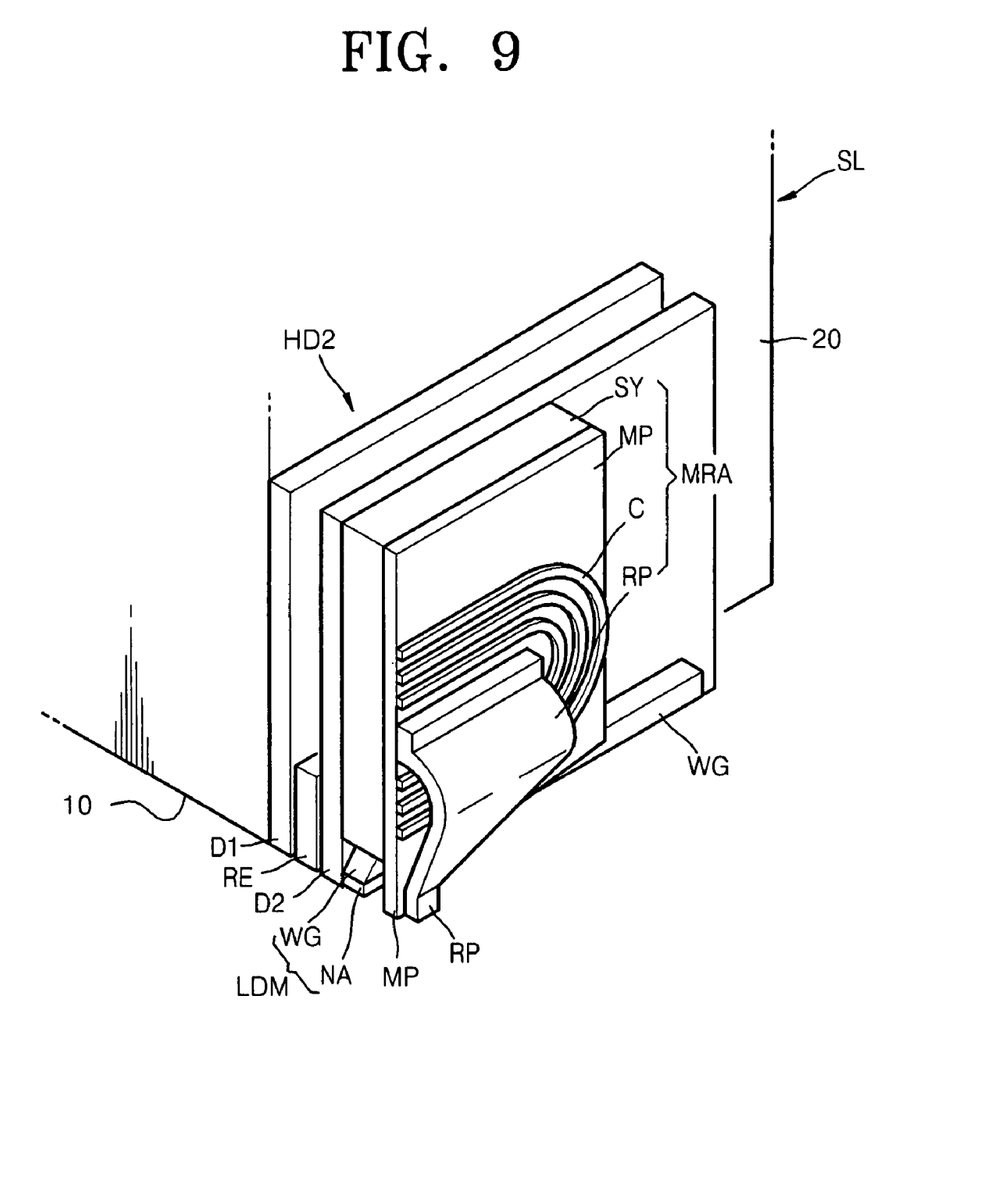
FIG. 9 is a perspective view of an HAMR head for recording and reproducing according to an exemplary embodiment of the present invention.

FIG. 9 is a view illustrating an HAMR head according to another exemplary embodiment of the present invention. The HAMR head according to the current exemplary embodiment of the present invention is an improved form of the HAMR head according to the previous exemplary embodiment of the present invention. Like reference numerals throughout FIGS. 8 and 9 denote like elements.

The HAMR head HD1 illustrated in FIG. 8 is a head for recording, while the HAMR head HD2 illustrated in FIG. 9 is a head for both recording and reproducing.

Referring to FIG. 9, the HAMR head HD2 includes first and second insulating layers D1 and D2 that are sequentially provided on a first surface 20 of a slider SL. The first and second insulating layers D1 and D2 have lower ends located on the same plane as a bottom surface 10 of the slider SL. A reproduction electrode RE is interposed between the first and second insulating layers D1 and D2. The reproduction electrode RE may have a lower end located on the same plane as the first and second lower ends. Information recorded on the recording medium is read through the reproduction electrode RE.

Although many details are specifically described in the description above, it should be understood that the description does not limit the scope of the present invention but merely shows examples of embodiments. For example, the positions of the components of an HAMR head may be varied, and different kinds of components may be used.

Also, a light delivery module having a C-shaped nano aperture of the exemplary embodiments of the present invention may be applied not only to the HAMR head but also to devices for single molecule detection, spectroscopy, and nano particle manipulation.

In addition, the technical aspect of the present invention may be employed for a storage device using quantum dots, nano patterns, and nano wires.

Moreover, a metal layer of the exemplary embodiments of the present invention may have plane side surfaces, not curved ones. Therefore, the spirit and scope of the present invention should be defined by the following claims, rather than the descriptions above.

As described so far, in the exemplary embodiments of the present invention, the shape of the light incident surface of the aperture passing light therethrough in the metal layer is different from the shape of the exit surface. The width of the aperture of the exemplary embodiments of the present invention may be tapered or gradually increased from the incident surface toward the exit surface.

Also, the structural characteristics of the aperture may allow an increase in both light intensity and power throughput at the light exit surface of the aperture. The increase in the light intensity and the power throughput of light may be further achieved by forming the groove around the aperture.

Therefore, the HAMR head provided with the light delivery module employing the aperture according to the exemplary embodiments of the present invention is able to emit a symmetrical light beam which has a high intensity and small spot size, thereby increasing a data recording density.

In addition, since the HAMR head of the exemplary embodiments of the present invention does not use the main pole as a ridge of the aperture, the magnetic properties of the main pole are not lowered due to heat.

While the present invention has been particularly shown and described with reference to the exemplary embodiments thereof, it will be understood by those of ordinary skill in the art that various changes in form and details may be made therein without departing from the spirit and scope of the present invention as defined by the following claims.

What is claimed is:

1. A recording head, comprising:
a metal layer for delivering light, the metal layer comprising an aperture, the aperture comprising:
an inlet and an outlet of different sizes; and
side surfaces that are curved;
wherein a sectional shape of the aperture taken at a random position between the inlet and the outlet of the aperture is a shape that allows resonance with light incident on the aperture.

2. A recording head, comprising:
a metal layer for delivering light and comprising an aperture, the aperture comprising:
an inlet and an outlet of different sizes; and
side surfaces that are curved;
wherein the aperture has a C-shape formed by a ridge of the metal layer.

3. The recording head of claim 2, wherein the sectional size of the ridge at a start point of the ridge changes towards an end point of the ridge.

4. The recording head of claim 2, wherein a sectional shape of the aperture taken at a random position between the inlet and the outlet of the aperture is a shape that allows resonance with light incident on the aperture.

5. The recording head of claim 4, wherein a width "a" of the sectional shape of the aperture along a long axis at the random position between the inlet and the outlet of the aperture is determined by an equation $$a = (a_0 + a_1 z + a_2 z^2) \times M,$$

where $a_0$ is 3.96231, $a_1$ is −0.00137, and $a_2$ is −0.0002, z denotes a distance between the inlet and the random position, and M is a constant determined by characteristics of light made incident on the aperture, and denotes a shortest distance between an end portion of the ridge and the metal layer facing the end portion.

6. The recording head of claim 4, wherein a width "s" of the ridge at the random position "z" between the inlet and the outlet of the aperture is determined by an equation $$s = -(2M/t) \times z + 3M,$$

where z is a distance which has a value "0" at the inlet and a value "t" at the outlet of the aperture, M is a constant determined by characteristics of light incident on the aperture, and denotes a shortest distance between an end portion of the ridge and the metal layer facing the end portion.

7. A recording head, comprising:
a metal layer for delivering light and comprising an aperture, the aperture comprising:
an inlet and an outlet of different sizes; and
side surfaces that are curved;
wherein a groove is formed around the inlet of the aperture.

8. A recording head, comprising:
a light waveguide; and
a metal layer for delivering light attached to an output end of the light waveguide and comprising an aperture, the aperture comprising:
an inlet and an outlet of different sizes; and
side surfaces that are curved.

9. The recording head of claim 8, wherein the aperture is a tapered type aperture.

10. The recording head of claim 8, wherein a width or a height of the inlet of the aperture is greater than a width or a height of the outlet of the aperture, respectively, or the width and the height of the inlet of the aperture are greater than the width and the height of the outlet of the aperture, respectively.

11. The recording head of claim 8, wherein the inlet of the aperture has a shape which allows resonance with light incident on the aperture.

12. The recording head of claim 8, wherein the outlet of the aperture has a shape which allows resonance with light incident on the aperture.

13. The recording head of claim 8, wherein an area of the inlet is the same as an area of the outlet.

14. The recording head of claim 8, wherein a sectional shape of the aperture taken between the inlet and the outlet of the aperture allows resonance with light incident on the aperture.

15. The recording head of claim 8, wherein the aperture has a section that is divided into a first portion having a rectangular shape, and two second portions that extend from both sides of the first portion along a long axis of the first portion in a direction that is perpendicular to the first portion and are spaced apart from each other, wherein a length of the first portion along the long axis, a length over which the second portion extends, a length of the first portion along a short axis of the first portion, and a distance between the two second portions at a position "z" between the inlet and the outlet of the aperture are determined by respective equations $a = (a_0 + a_1 z + a_2 z^2) \times M$, $b = 2M$, $d = M$, and $s = -(2M/t) \times z + 3M$, where z has a value "0" at the inlet and a value "t" at the outlet of the aperture, a denotes the length of the first portion along the long axis of the first portion, $a_0 = 3.96231$, $a_1 = -0.00137$, $a_2 = -0.0002$, d denotes the length of the first portion along the short axis of the first portion, b/2 denotes a length over which the second portion extends, s denotes the distance between the two second portions, t denotes a thickness of the metal layer which is a depth of the aperture, and M is a constant determined according to characteristics of light incident on the aperture.

16. The recording head of claim 15, wherein, when a and s are 3M and M, respectively, M is determined by an equation $$\frac{b}{\lambda_c} = \frac{b}{2(a-s)} \left[ 1 + \frac{4}{\pi}\left(1 + 0.2\sqrt{\frac{2b}{a-s}}\right)\frac{2b}{a-s}\ln\csc\frac{\pi}{2}\frac{d}{b} + \left(2.45 + 0.2\frac{s}{a}\right)\frac{sb}{d(a-s)} \right]^{-1/2},$$

where $\lambda_c$ denotes a cutoff wavelength of light incident on the aperture.

17. The recording head of claim 8, further comprising a groove around the inlet of the aperture.

18. The recording head of claim 17, wherein the groove is a ring type groove.

19. The recording head of claim 18, wherein the ring type groove has an outer radius that is 0.5 to 1.5 times greater than a wavelength of light incident on the aperture.

* * * * *